(12) United States Patent
Leeb et al.

(10) Patent No.: US 8,078,914 B2
(45) Date of Patent: Dec. 13, 2011

(54) OPEN ERROR-HANDLING SYSTEM

(75) Inventors: Gunter Leeb, Redmond, WA (US); Yitzchak Naveh-Benjamin, Redmond, WA (US); Scott M. Roberts, Bothell, WA (US); Samar Abbas, Woodinville, WA (US); Shung Lai Franky Lam, Bothell, WA (US); Noaa Avital, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 230 days.

(21) Appl. No.: 12/477,504

(22) Filed: Jun. 3, 2009

(65) Prior Publication Data

US 2010/0313073 A1 Dec. 9, 2010

(51) Int. Cl.
G06F 11/00 (2006.01)
(52) U.S. Cl. .................... 714/26; 714/38.1; 714/47.1
(58) Field of Classification Search .................. 714/26, 714/47.1, 38.1
See application file for complete search history.

(56) References Cited

U.S. PATENT DOCUMENTS

| | | | |
|---|---|---|---|
| 5,379,407 A | 1/1995 | Todd | |
| 6,334,193 B1 | 12/2001 | Buzsaki | |
| 6,550,024 B1 | 4/2003 | Pagurek et al. | |
| 6,983,362 B1 * | 1/2006 | Kidder et al. | 713/1 |
| 7,137,043 B1 | 11/2006 | Kane et al. | |
| 7,379,846 B1 * | 5/2008 | Williams et al. | 702/185 |
| 7,441,152 B2 * | 10/2008 | Kato | 714/26 |
| 7,500,143 B2 * | 3/2009 | Buia et al. | 714/26 |
| 7,827,446 B2 * | 11/2010 | Kimura et al. | 714/43 |
| 7,836,357 B2 * | 11/2010 | Fischer et al. | 714/48 |
| 7,895,471 B2 * | 2/2011 | Boone et al. | 714/25 |
| 2004/0019835 A1 | 1/2004 | Marisetty et al. | |
| 2006/0143515 A1 * | 6/2006 | Kuramkote et al. | 714/15 |
| 2006/0253740 A1 * | 11/2006 | Ritz et al. | 714/38 |
| 2007/0061634 A1 | 3/2007 | Marisetty et al. | |
| 2008/0077935 A1 | 3/2008 | Breiter et al. | |
| 2009/0094484 A1 * | 4/2009 | Son et al. | 714/26 |

OTHER PUBLICATIONS

Blogs.msdn.com "The Old New Thing", Jan. 17, 2005, 22 pages. http://blogs.msdn.com/oldnewthing/archive/2005/01/17/354399.aspx.
ZF App Preview Walkthrough, Based on information and belief available, at least as early as Apr. 6, 2009, 25 pages, http://framework.zend.com/svn/framework/laboratory/Primitus/docs/ZFApp-preview-intro.ppt#268, 13,Render%20Flow.

* cited by examiner

Primary Examiner — Philip Guyton
(74) Attorney, Agent, or Firm — Workman Nydegger

(57) ABSTRACT

The embodiments disclosed herein extend to methods, systems, and computer program products for error resolution in a computing system that includes a health module. The health module monitors components of the system for runtime errors and provides error resolution templates. The error resolution templates include metadata that specifies actions that may resolve the error and error handlers corresponding to the actions that may correct the error. The system may be extended by the addition and/or modification of the error resolution templates. The error resolution templates may also be used to facilitate the correction of runtime errors in the system.

15 Claims, 6 Drawing Sheets

OPEN ERROR-HANDLING SYSTEM

CROSS-REFERENCE TO RELATED APPLICATIONS

Not Applicable.

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Many computing systems are implemented as component-based systems. Each component is a routine or program that executes on the central computing system. Accordingly, the designer of each component designs the underlying code for each component that is executed in operation. The component designer typically also defines error types for the component and one or more error handlers that may resolve the error.

The error handlers for each component, however, generally cannot be shared with other components of the system. This requires component designers to implement separate error resolution mechanisms for each individual component of the system, which can lead to duplication of resources.

In addition, new types of errors may later be identified by a component designer. In order to implement new error handlers or to modify existing error handlers for the new error types, the designer generally must modify the underlying component code, which may be a difficult task or even impossible if the component does not expose an extensibility mechanism. Further, for systems that are extensible, new error types and possibly new ways to deal with errors may exist that are unknown to a system designer.

BRIEF SUMMARY

The embodiments disclosed herein extend to methods, systems, and computer program products for error resolution in a computing system that includes a health module. The health module monitors components of the system for runtime errors and provides error resolution templates. The error resolution templates include metadata that specifies actions that may resolve the error and error handlers corresponding to the actions that may correct the error.

In one embodiment, a component may associate an error type with an error resolution template and may define additional error handlers for resolving error produced at the component. In this embodiment, the component may define additional error resolution handlers and/or error resolution templates. First and second error types are defined. Various existing error resolution templates are accessed and the first error type is associated with the first existing error resolution template. The first existing error resolution template includes an error handler configured to resolve the first error type.

A new error resolution template that includes a new error handler configured to resolve the second error type may be submitted to the system and associated with the second error type. This will extend the error resolution capabilities of the system.

In another embodiment, error resolution may be provided to a system error. An error that is generated by a component of the computing system is received. The error is mapped to an error resolution template corresponding to an error type of the received error. A user interface is provided with a resolution action for resolving the error. An indication that the user desires to implement the resolution action may be received and, in consequence, one or more error handlers of the error resolution template may be executed to correct the error.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The embodiments disclosed herein extend to methods, systems, and computer program products for error resolution in a computing system that includes a health module. The health module monitors components of the system for runtime errors and provides error resolution templates. The error resolution templates include metadata that specifies actions that may resolve the error and error handlers corresponding to the actions that may correct the error.

In one embodiment, a component may define additional error resolution handlers and/or error resolution templates. First and second error types are defined. Various existing error resolution templates are accessed and the first error type is associated with the first existing error resolution template, as the first existing error resolution template includes an error handler configured to resolve the first error type.

A new error resolution template that includes a new error handler configured to resolve the second error type may be submitted to the system and associated with the second error type. This will extend the error resolution capabilities of the system.

In another embodiment, an error generated by a component of the computing system is received. The error is mapped to an error resolution template corresponding to an error type of the received error. A user interface is provided with a resolution action for resolving the error. An indication that the user desires to implement the resolution action may be received and, in consequence, one or more error handlers of the error resolution template may be executed to correct the error.

Figure 1:
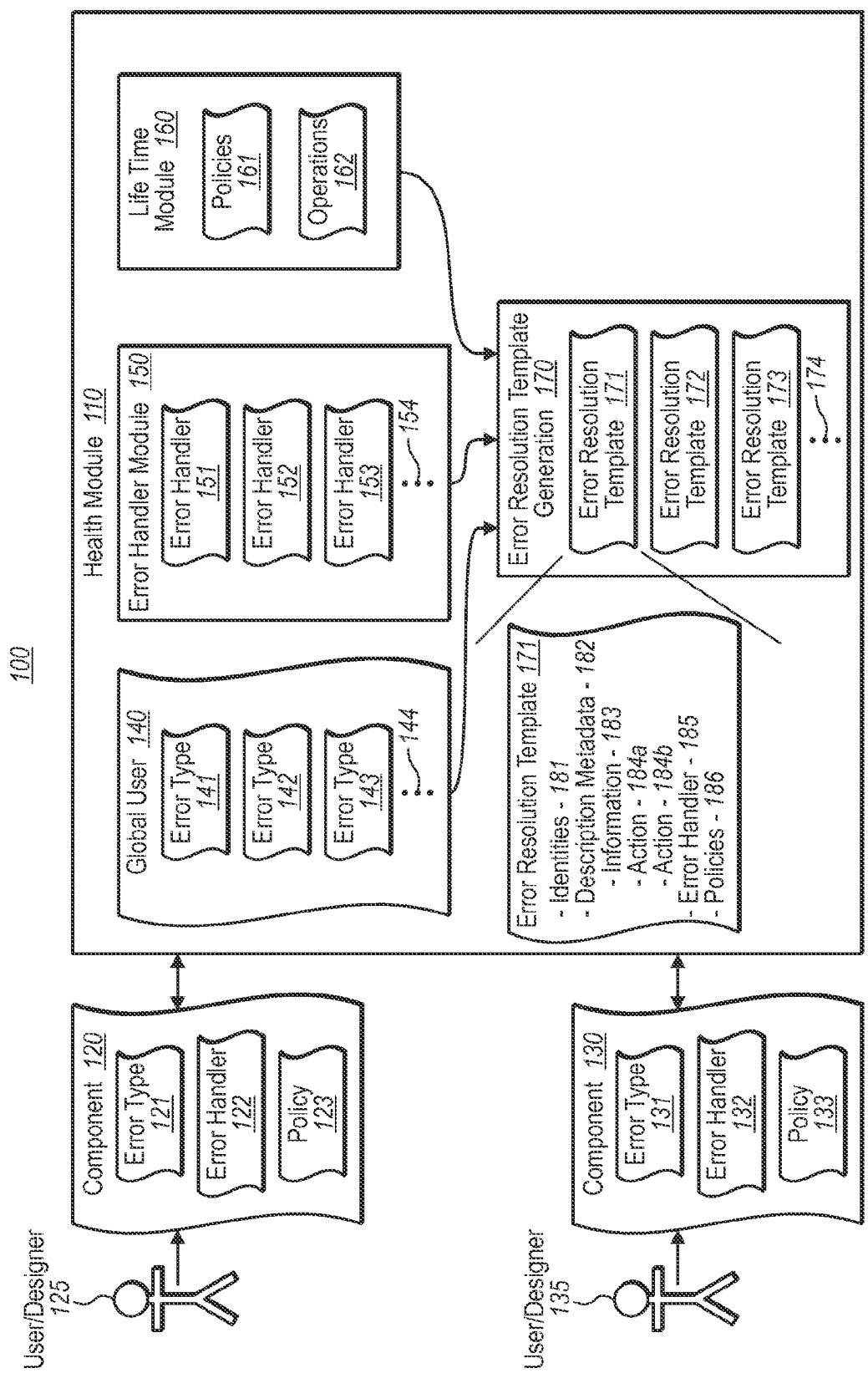
FIG. 1 illustrates a computer architecture for error resolution in which the embodiments disclosed herein may be performed.

FIG. 1 illustrates a computer architecture 100 that may implement to practice the embodiments disclosed herein. As illustrated, the computer architecture 100 includes various modules and components. The modules and components of the computer architecture 100 may be implemented as software, hardware, or any combination of software and hardware as circumstances warrant. In addition, although creation modules and components are shown as being separate, such modules and components may be part of another module or component of the computer architecture 100. Further, the computer architecture 100 may include more modules and components than those shown in FIG. 1.

The computer architecture 100 includes a health module 110. The health module 110 is configured to monitor the computer architecture 100 for error and provides for unified and centralized error resolution as will be explained in more detail to follow.

The computer architecture 100 also includes components 120 and 130. It will be appreciated that computer architecture 100 may include numerous other components as circumstances warrant. The components 120 and 130 are programs, routines and the like that run on the computer architecture 100.

The health module 110 includes a global list 140 of errors of various types that may occur while the components of the computer architecture are executing. For example, the global list 140 may include error types 141, 142, 143, and potentially any number of additional error types as illustrated by ellipses 144. Each of the error types 141-144 may be persisted in a memory of the computer architecture 100 as needed. Examples of error types that may be included in the global list 140 include a database error, a validation error, a commit error, or an operating system error. It will be appreciated that any number of additional errors may also be included in the global list 140.

In operation, each of the components of the computer architecture 100 is able to define their own error types and to provide this information to the health module for inclusion in the global list. For example, a user/designer 125 of component 120 may define an error type 121 for inclusion in the global list 140. Likewise, a user/designer 135 of the component 130 may define an error type 131 for inclusion in the global list 140. As will be appreciated, over time the functionality or composition of the system may change, which may render some error types no longer valid. That is, error instances of those types may no longer occur. Accordingly, the components 120 and 130 may also remove error types that are no longer valid from the global list 140 as needed.

The health module 110 also includes an error handler module 150 that includes various error handlers 151, 152, 153, and potentially any number of additional error handlers as illustrated by ellipses 154. The error handlers 151-154 represent operations that are configured to resolve the error types included in the global list 140.

As with error types, the components 120 and 130 are also able to define various error handlers and provide the error handlers to the error module 150. For example, the user/designer 125 may define an error handler 122 while the user/designer 135 may define an error handler 132. The components 120 and 130 may also remove error handlers from the error handler module 150 as needed.

In some embodiments, the health module 110 includes a life time monitoring module 160. The life time monitoring module 160 supports different policies 161 for error removal. For instance, one of the policies 161 may kill an error after a certain amount of time has passed. Another policy may specify explicit dismissal of the error or may specify that an error remain until resolved. The life time monitoring system may include operations 162 that are configured to implement the policies 161.

The components 120 and 130 may also define life time policies for their respective error types. For example, user/designer 125 may define a life time policy 123 and user/designer 135 may define a life time policy 133. These life time policies may be provided to the life time management module 160 as needed.

The health module 110 also includes an error resolution template generator 170 that is configured to generate various error resolution templates 171, 172, 173, and potentially any number of additional error resolution templates as illustrated by ellipses 174. The error resolution template generator 170 accesses the error types 141-144 from the global list 140 and the error handlers 151-154 from the error handlers 150. The error resolution template generator then creates a template that associates a given error type with one or more error handlers that may be implemented to resolve the error type. For example, the error resolution template 171 may associate the error type 141, with the error handler 151, and perhaps the error handler 152. As mentioned, an error type may have any number of error handlers associated with it as long as the error handlers are configured to resolve the error type.

The error resolution template generator 170 is also configured to include various metadata in the error resolution templates 171-174. The metadata includes such information as an identifier for the error resolution template, information that describes the error type and provides information that helps a user choose an action (i.e., one or more error handlers) to resolve the error. This information may be in the form of one or more actions, that when implemented, cause a corresponding error handler to be executed to thereby resolve the error type.

In those embodiments that include the lifetime monitoring module 160, the error resolution template generator 170 accesses any policies 161 corresponding to the error type and includes the policy in the error resolution template.

An example embodiment of the error resolution template 171 is shown in greater detail in FIG. 1. The other error resolution templates may be similar to the error resolution template 171, although the other error resolution templates may include other elements than error resolution template 171. As shown, the error resolution template 171 includes a unique identifier 181 that is used when mapping an error instance to an appropriate error resolution template as will be explained in more detail to follow.

Description metadata 182 is also included in the error resolution template 171. The description metadata 182 includes information 183 that describes the error type. The description metadata 182 also includes various resolutions actions 184a and 184b that specify actions that may be performed to resolve the error type.

The error resolution template 171 may further include one or more error handlers 185 that correspond to the error handlers 151-154. Alternatively, the error resolution template 171 may include a pointer to the error handlers 185. As mentioned, the error handlers 185 are operations that are configured to resolve errors of the corresponding type. The error handlers 185 may include metadata which includes further instructions to the users such as specifying the name of the error handler, a description of the error handler, error resolution instructions, and context-specific parameters.

The error handlers 185 are typically associated with the resolution action 184. For example, as will be described in more detail to follow, a user interface element may list the action 184 that will resolve the error. A user may select the action, which will cause the corresponding error handler to be executed.

The error resolution template 171 may also include lifetime policies 186 for those embodiments with the lifetime monitoring module 160. As described, the lifetime policies provide information about how long an error may last without being resolved. That is, the lifetime policies are rules specifying when an error instance is removed from the health module.

The implementation of error resolution templates provides a unified and configurable way for the computer architecture 100 to handle error resolution. Rather than having to implement separate error resolution systems, the components of the computer architecture 100 are able to utilize the health module 110 for error resolution. As mentioned, the components are able to add error types and error handlers to the system for inclusion in the error resolution templates.

The computer architecture 100 is also extensible. That is, a designer may add a new component to the computer architecture 100 without the need to design a separate resolution system. Rather, the designer is able to define error types and associate these error types with existing error resolution templates. In addition, the designer is able to utilize the functions of health module 110 to create new error resolution templates if existing error templates are not sufficient for an error type.

Figure 2:
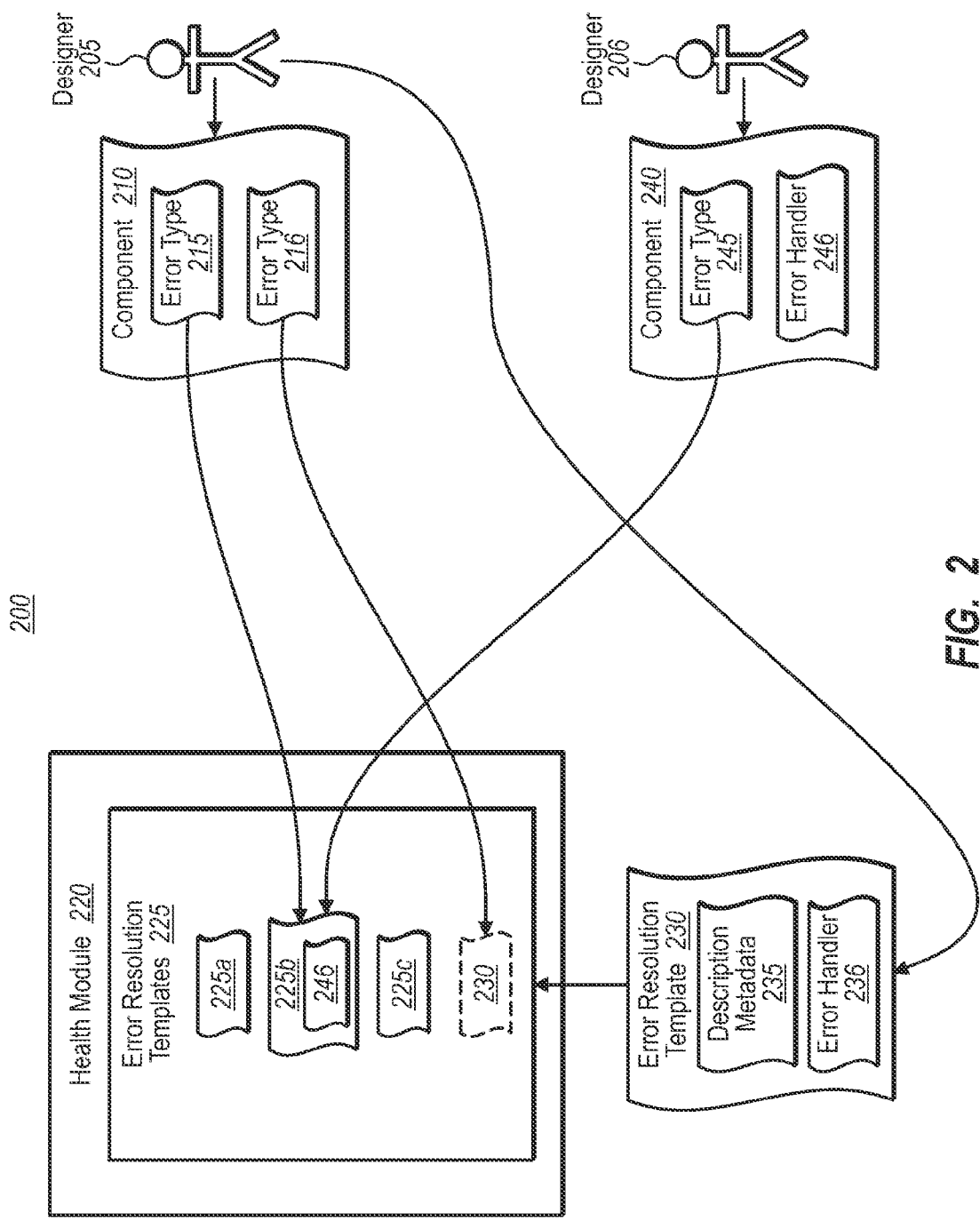
FIG. 2 illustrates an alternative view of the computer architecture of FIG. 1 in which the embodiments disclosed herein may be performed.

Attention is now made to FIG. 2, which shows an alternative embodiment of computer architecture 100, which is designated at 200. FIG. 2 illustrates some of the extensibility of the computer architecture. As illustrated, a designer 205 may implement a component 210 for inclusion into the computer architecture 200. While implementing the component 210, the designer 205 may use the computer architecture to define a first error type 215 and a second error type 216 along with the specifications for these errors.

The health module 220 may be accessed. As described in relation to FIG. 2, the health module may include various existing error resolution templates 225, including error resolution templates 225a, 225b, and 225c. The error resolution templates 225 may include description metadata specifying the one or more actions that may resolve an error type and one or more error handlers as described.

The health module 220 or some other element of computer architecture 200 may determine that the first error type 215 corresponds with an existing error resolution template 225b. That is, the existing error resolution template 225b includes an error handler that is configured to resolve the first error type 215 when executed. Accordingly, the first error type 215 may be associated with the existing error resolution template 225b. There is no need to define new error handlers or templates for the first error type 215. In this way, the computer architecture is extended as the component 210 may use an existing error resolution template to resolve its errors. It should be noted that to resolve an error includes executing resolution operations or actions that deal with a particular error as will be explained in more detail to follow. In addition, resolving an error may also include a mechanism to retrieve more information on the error or to record, log, or distribute information about the error.

The health module or some other element of computer architecture 200 may also determine that the second error type 216 does not correspond to any of the existing error resolution templates 225. That is, the computer architecture may determine that none of the existing error handlers associated with the existing error resolution templates are configured to resolve second error type 216. Accordingly, the computer architecture 200 allows the designer 205 to generate and submit a new error resolution template when necessary.

For example, the designer 205 may utilize the health module 220 or some other element of computer architecture 200 to generate a new error resolution template 230. The new error resolution template 230 will include description metadata 235 corresponding to the second error type 216. As described above, the description metadata 235 may include information about the second error type 216 and one or more actions that may be performed to resolve the error type 216.

The designer 205 may also define, in some embodiments, a new error handler 236 that is not associated with any of the existing error resolution templates and that is configured to resolve the second error type 216. This new error handler 236 may then be added to the new error resolution template 230. In other embodiments, the error handler 236 may be an existing error handler that is configured to resolve the second error type.

As shown, the new error resolution template 230 may be added to the existing error resolution templates 225. The second error type 216 may be associated with the new error resolution template 230, which may be used to resolve the second error type 216. Accordingly, adding the new error resolution template 230 to the existing error resolution templates 225 extends the error resolution capabilities of the health module 220 and the computer architecture 200.

The computer architecture 200 is also extensible in other advantageous ways. For example, a designer 206 may implement a component 240 and may define a third error type 245. The health module 220 or some other element of computer architecture 200 may determine that the third error type 245 corresponds with the existing error resolution template 225b. That is, the existing error resolution template 225b includes at least one error handler that is configured to resolve the third error type 245 when executed. Accordingly, the third error type 245 may be associated with the existing error resolution template 225b. Thus, more than one error type may share an error resolution template when the error resolution template is able to resolve both error types. In addition, in some embodiments, an error type may have more than one error resolution template associated with it to further provide additional extensibility as needed.

Alternatively, the health module 220 or some other element of computer architecture 200 may determine that the third error type 245 corresponds with the new error resolution template 230 that is generated by designer 205. The third error type 245 may be associated with the new error template 230. Thus, once a new error template is added to the computer architecture, it may be used by other components of the computer architecture when appropriate.

As further illustrated, the designer 206 may define a new error handler 246 that is configured to resolve first error type 215. This new error handler 246 may be provided to the health module 220, where it may be associated with the existing error resolution error template 225b. It may also be associated with other error resolution templates 225 as appropriate. In addition, existing error resolution templates may be removed from the computer architecture by components. Alternatively, error handlers and description metadata may be removed from existing error resolution templates. Accordingly, error resolution templates may be modified by users of the computer architecture 200. Note that although the designer 206 is illustrated as having added the error handler 246, the designer 205 or any other component of the computer architecture 200 may also modify error resolution templates as needed.

Figure 3:
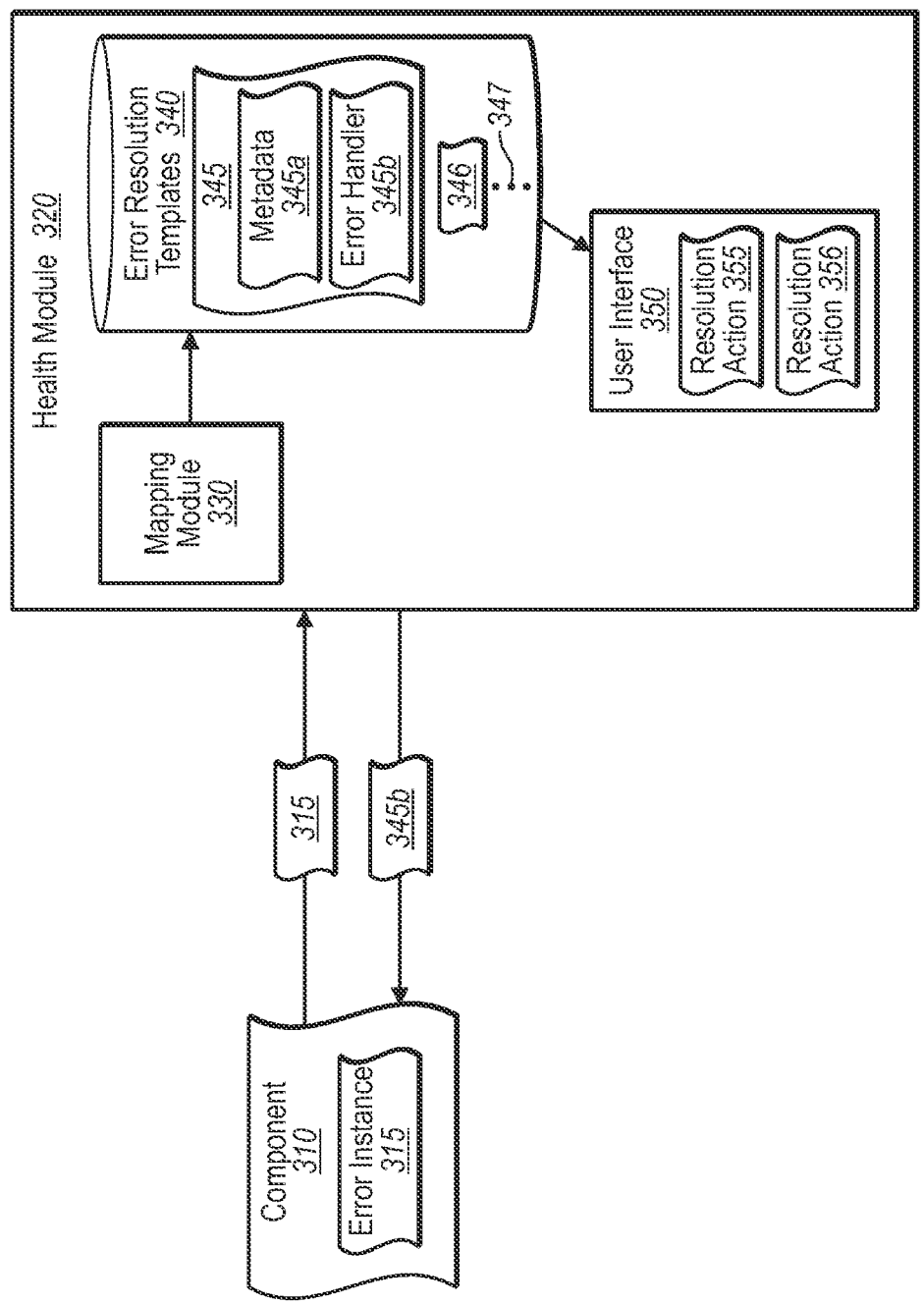
FIG. 3 illustrates an alternative view of the computer architecture of FIG. 1 in which the embodiments disclosed herein may be performed.

Turning now to FIG. 3, an alternative embodiment of computer architecture 100, designated at 300, is illustrated. As shown, a component 310 generates a runtime error instance 315. The run time error instance 315 may be of any error type that the component 310 is capable of generating.

The error instance 315 is then received by the health module 320. In this embodiment, the health module 320 includes a mapping module 330 and one or more error resolution templates database 340 including error resolution templates 345, 346, and potentially any number of additional error resolution templates 347. The error resolution templates 345-347 may correspond to other error resolution templates discussed previously. Accordingly, the error resolution templates 345-347 may include description metadata that specifies one or more resolution actions that may resolve an error and one or more error handlers that are configured to resolve the error when executed.

In operation, the mapping module 330 receives the error instance 315, identifies the error type corresponding to the error instance 315, and maps the error instance to an error resolution template that corresponds to the error type of the received error. For example, the error 315 may correspond to the error resolution template 345 as the error template 345 includes error resolution handlers 345b that are configured to resolve the error type corresponding to the error instance 315.

Once mapped, a user interface 350 is provided with a resolution action 355 that is defined by description metadata 345a of the error resolution template 345. The user interface element is configured to allow a user to access the information provided by the description metadata 345a. For example, the user interface 350 may show an error message that describes the nature of error 315. In addition, as mentioned, the user interface 350 may show an action 355 that may resolve the error. In some embodiments, the user element may also show a second action 356 that may also resolve the error 315. It should be noted that although the user interface element is shown as part of health module 320, the user interface element 350 may be implemented in other parts of computer architecture 300.

The user may then decide to implement the resolution action 355 or the resolution action 356. Implementation of the resolution actions causes the one or more error handlers 345b to be executed. In other words, when the user, through use of the interface 350, implements the resolution action 355, the error handler 345b associated with the action is caused to be executed. The execution of the error handler may correct the error 315.

In some embodiments, the error handler is included at the health module 320. Thus, the execution of the error handler and the subsequent correction of the error 315 occur at the health module. In other embodiments, however, the error handler may be included at the component 310 or may be provided to the component 310 by the health module 320. In such embodiments, the execution of the error handler and the subsequent correction of the error 315 occur at the component 310.

In one embodiment, an error message and resolution action may indicate that a semicolon should be added to a specific line of the code of component 210. A pushbutton user interface element may be provided as part of the action 355. Accordingly, when the user presses the button, which is an example of receiving an indication that the user desires to implement the resolution action, the associated error handler 345b is executed. In this case, the semicolon is automatically added to the specific line of code.

Accordingly, the computer architecture 300 allows for the automatic resolution of runtime errors using predefined error resolution templates. Advantageously, the component need not implement its own error resolution. Further, the health module is able to act as a centralized, unified location for error handling of the system.

Figure 4:
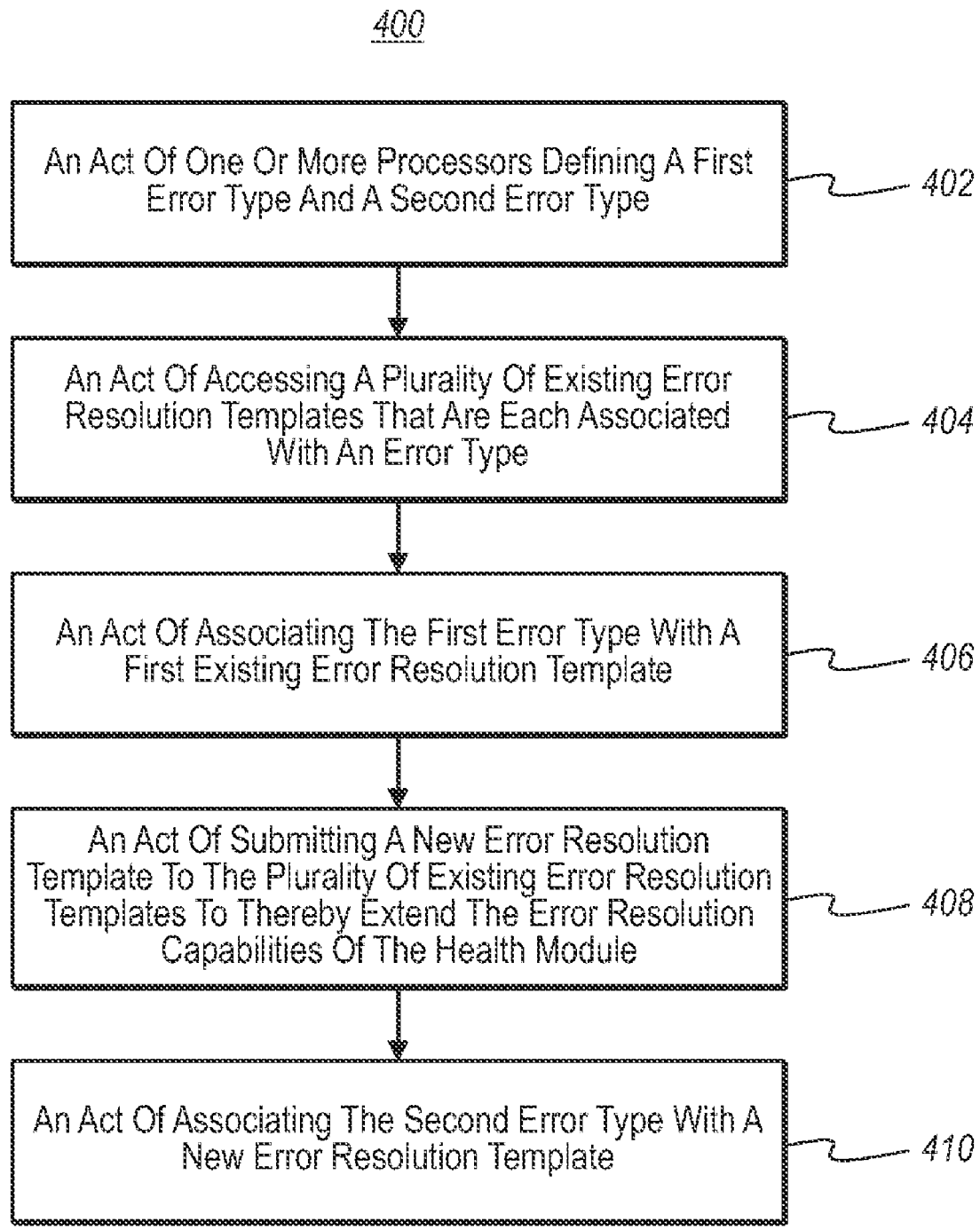
FIG. 4 illustrates a flowchart of a method for a component to associate an error type with an error resolution template and to define additional error handlers for resolving error produced at the component.

FIG. 4 illustrates a flowchart of a method 400 for a component to associate an error type with an error resolution template and to define additional error handlers for resolving error produced at the component. Method 400 will be described with frequent reference to the computer architectures of FIGS. 1-2. Note, however, that the computer architectures of FIGS. 1-2 are only examples of numerous computer architectures that may be employed to practice method 400.

The method 400 includes an act of one or more processors defining a first error type and a second error type (act 402). For example, the designer 205 may use the processors to define the first error type 215 and the second error type 216.

The method 400 also includes an act of accessing a plurality of existing error resolution templates that are each associated with an error type (act 404). The plurality of existing error resolution templates each include description metadata that specifies one or more actions that may resolve the specific error type and one or more error handlers corresponding to the one or more actions and configured to resolve the specific error type when executed. For instance, the existing error resolution templates 225 may be accessed. As described, each of these error resolution templates may include description metadata 182 that includes error information 183 and resolution actions 184 that may resolve the error type. The existing error resolution templates 225 also include error handlers 185 that, when executed, are configured to resolve the first error type.

The method 400 further includes an act of associating the first error type with a first existing error resolution template (act 406). The first existing error resolution template includes an error handler configured to resolve the first error type. For example, the first error type 215 may be associated with existing error resolution template 225b when it is determined that error resolution template 225b may resolve first error type 215.

The method 400 additionally includes an act of submitting a new error resolution template to the plurality of existing error resolution templates to thereby extend the error resolution capabilities of the health module (act 408) and an act of associating the second error type with a new error resolution template (act 410). In some embodiments, the new error resolution template may include a new error handler that was not previously associated with any of the existing error resolution templates and is configured resolve the second error type. In other embodiments, the new error resolution template may include an existing error handler that is configured to resolve the second error type.

For example, the new error resolution template 230 may be generated and submitted to the existing error resolution template 225. The new error resolution template may include the description metadata 235 and the error handler 236. As described above, the error handler 236 was not previously part of any of the existing error resolution templates 225. The new error resolution template 230 may then be associated with the second error type 216.

Figure 5:
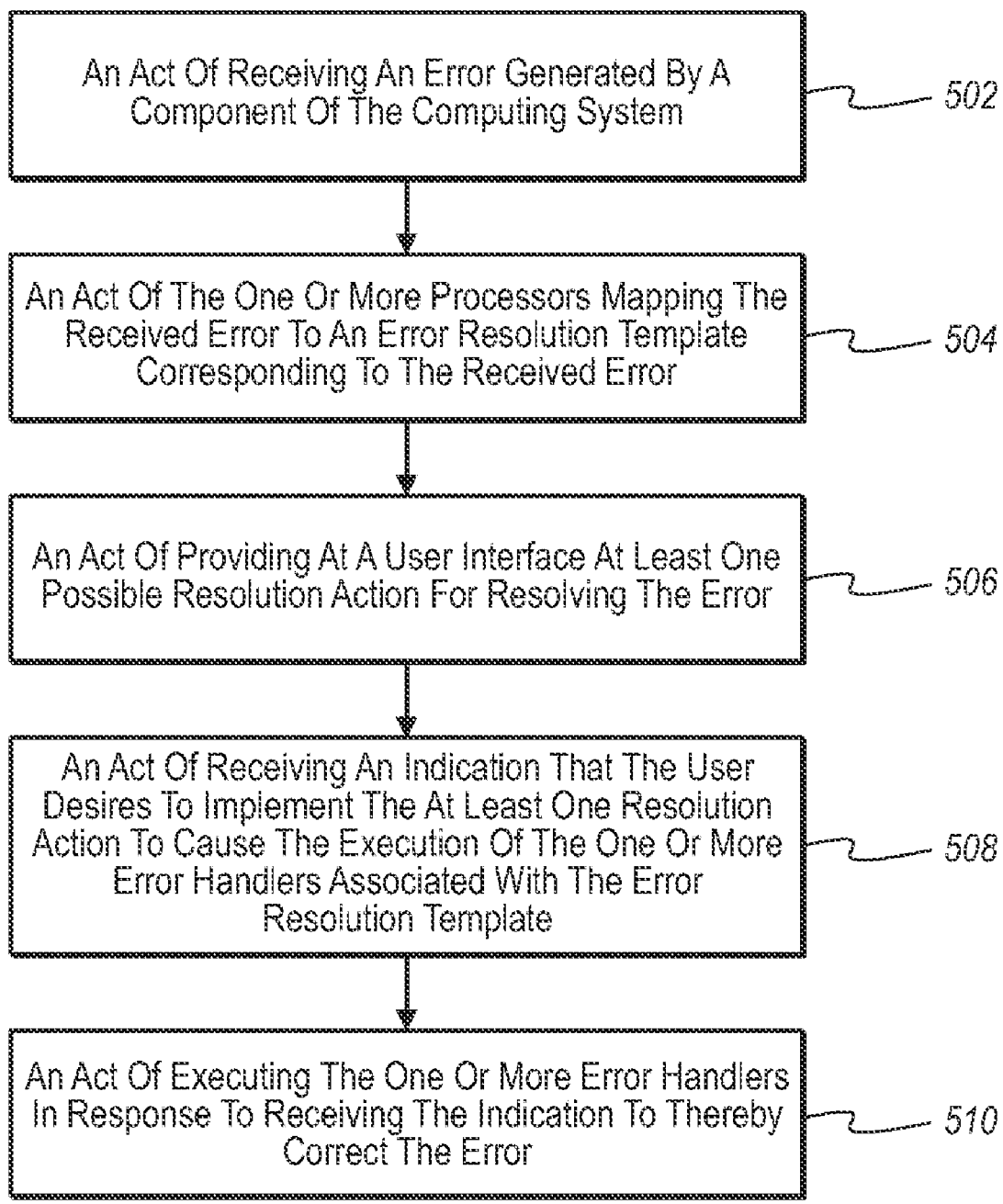
FIG. 5 illustrates a flowchart of a method for a computing system to perform a method providing error resolution to a system error.

FIG. 5 illustrates a flowchart of a method 500 for a computer architecture to perform a method providing error resolution to a system error. Method 500 will be described with frequent reference to the computer architectures of FIGS. 1-3. Note, however, that the computer architectures of FIGS. 1-3 are only examples of numerous computing systems that may be employed to practice method 500.

Method 500 includes an act of receiving an error generated by a component of the computing system (act 502). For example, the component 310 may generate a runtime error instance 315. The error instance 315 is received by the health module 320.

The method 500 also includes an act of the one or more processors mapping the received error to an error resolution template corresponding to an error type of the received error (act 504). The error resolution template includes description metadata that specifies one or more resolution actions that may resolve the error and one or more error handlers associated with the one or more actions that are configured to resolve the error when executed.

For example, the mapping module 330 may map the error instance 315 to an error resolution template 345 that corresponds to the error 315. As previously discussed, the error resolution template 345 may include description metadata and error handlers that are configured to resolve error 315.

The method 500 further includes an act of providing at a user interface at least one possible resolution action for resolving the error (act 506). The at least one resolution action includes at least a part of the description metadata such that a user may implement the resolution action. For example, the resolution action 355 associated with the error resolution template 345 may be provided to the user interface 350.

The method 500 additionally includes an act of receiving an indication that the user desires to implement the at least one resolution action to cause the execution of the one or more error handlers associated with the error resolution template (act 508) and an act of executing the one or more error handlers in response to receiving the indication to thereby correct the error (act 510). For example, the user may select resolution action 355. This will cause the execution of the error handlers 345a associated with the error resolution template 345. The executed error handler 345a will then resolve the error instance 315.

Although methods have been described with respect to FIGS. 4-5, the embodiments disclosed herein may extend to computer program products comprising one or more computer-readable media having thereon one or more computer-executable instructions that, when executed by one or more processors of the server computing system, cause the computing system to perform all or portions or either of these methods. For instance, referring to FIG. 6, memory 604, communication channels 608, and computer storage media 612 may represent examples of such computer-readable media. The memory 604 and computer storage media 612 represent examples of physical computer-readable media in the form of physical storage and/or memory media.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations (e.g., have one or more processors and system memory), including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 6:
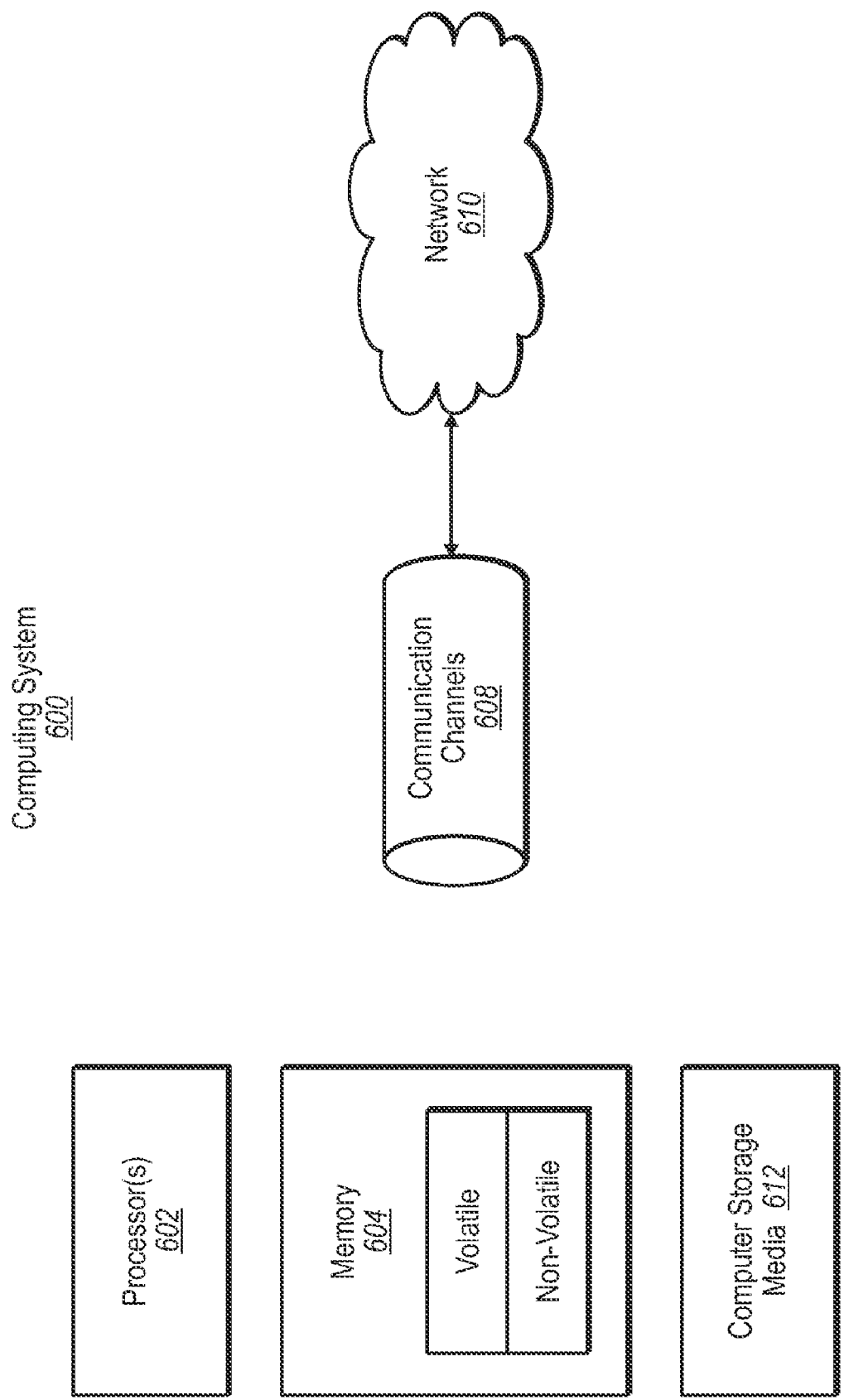
FIG. 6 illustrates a computing system in which the embodiments disclosed herein may operate.

FIG. 6 shows a schematic diagram of an example computing system 600 that may be used to implement features described herein. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Referring to FIG. 6, in its most basic configuration, a computing system 600 typically includes at least one processing unit 602 and memory 604. The memory 604 may be system memory, which may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage such as physical storage media. Such storage may be removable or non-removable, and may include (but is not limited to) PCMCIA cards, magnetic and optical disks, magnetic tape, and the like.

As used herein, the term "module" or "component" can refer to software objects, applications, or routines that execute on the computing system. The different components, modules, engines, and services described herein may be implemented as objects or processes that execute on the computing system (e.g., as separate threads or as part of a single application). While the system and methods described herein may be implemented in software, implementations in hardware, and in combinations of software and hardware are also possible and contemplated.

In the description, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 604 of the computing system 600. Computing system 600 may also contain communication channels 608 that allow the computing system 600 to communicate with other computing systems over, for example, network 610. The computing system 600 may also include computer storage media 612 such as that previously discussed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computer system including one or more processors and system memory, a method of providing unified and configurable error resolution for one or more components executing at the computer system, the method comprising:
   storing a global list of errors of various types that may occur while any of the one or more components are executing;
   storing a plurality of error handlers at an error handler module, each of which define operations configured to resolve error types stored in said global list;
   storing a plurality of policies at a life time module, each policy specifying actions for error removal;
   each of the one or more components performing the following:
      defining its own error types and adding the defined error types to said global list;
      defining its own error handlers and adding the defined error handlers to said error handler module;
      defining one or more polices for its own defined error types and adding the defined policies to said life time module;
   generating at a template generator a plurality of error resolution templates by performing the following:
      accessing error types stored at said global list;
      accessing error handlers from said error handler module;
      accessing polices from said life time module;
      associating at least one accessed policy and at least one error handler with each accessed error type, and then storing each accessed error type with the associated error handler and policy in a separate error resolution template;
   during execution of the one or more components, identifying first and second error types;
   identifying from the plurality of error resolution templates at the template generator a first error resolution template configured to resolve the first error type and associating the first error type with the first error resolution template;
   in the event an error resolution template cannot be identified for the second error type, submitting a new error resolution template which includes at least one error handler configured to resolve the second error type to the template generator and adding it to the plurality of error resolution templates to thereby extend the error resolution capabilities of the template generator; and
   thereafter associating the second error type with the new error resolution template, to resolve the second error type.

2. The method in accordance with claim 1, wherein the first and second error types are one of a database error, a validation error, a commit error, or an operating system error.

3. The method in accordance with claim 1, further comprising:
   defining a third error type; and
   associating the third error type with the first error resolution template, wherein the first error resolution template includes an error handler configured to resolve the third error type.

4. The method in accordance with claim 1, further comprising:
   defining a third error type; and associating the third error type with the new error resolution template, wherein the new error resolution template includes an error handler configured to resolve the third error type.

5. The method in accordance with claim 1, further comprising:
removing a second existing error resolution template from a listing of error resolution templates.

6. The method in accordance with claim 1, further comprising:
defining a new error handler configured to resolve the first error type; and
associating the first error resolution template with the error handler.

7. The method in accordance with claim 1, wherein each error handlers includes metadata specifying the name of the error handler, a description of the error handler, error resolution instructions, and context-specific parameters.

8. The method in accordance with claim 1, wherein each error resolution template further includes description metadata having a unique identifier for the error resolution template.

9. In a computer system including one or more processors and system memory, a method of providing unified and configurable error resolution for one or more components executing at the computer system, the method comprising:
storing a global list of errors of various types that may occur while any of the one or more components are executing;
storing a plurality of error handlers at an error handler module, each of which define operations configured to resolve error types stored in said global list;
storing a plurality of policies at a life time module, each policy specifying actions for error removal;
each of the one or more components performing the following:
defining its own error types and adding the defined error types to said global list;
defining its own error handlers and adding the defined error handlers to said error handler module;
defining one or more polices for its own defined error types and adding the defined policies to said life time module;
removing at least one or more of (i) an error type from the global list, (ii) an error handler from the error handler module, or (iii) a policy from the life time module;
generating at a template generator a plurality of error resolution templates by performing the following:
accessing error types stored at said global list;
accessing error handlers from said error handler module;
accessing polices from said life time module;
associating at least one accessed policy and at least one error handler with each accessed error type, and then storing each accessed error type with the associated error handler and policy in a separate error resolution template, each error resolution template further including a unique identifier used when mapping an error type to the error resolution template, description metadata that defines the error type and resolution actions to be taken for the error type;
during execution of the one or more components, identifying an error type;
identifying from the plurality of error resolution templates at the template generator an error resolution template configured to resolve the error type and associating the error type with the error resolution template;
based on the error resolution template identified for the error type, providing at a user interface at least one possible resolution action for resolving the error, the at least one resolution action including at least a part of the description metadata for the error type such that a user may implement the resolution action; and
implement the resolution actions in the identified error resolution template to cause the execution of at least one error handlers associated with the identified error resolution template.

10. The method in accordance with claim 9, wherein executing the at least one error handlers occurs at one of the component.

11. The method in accordance with claim 9, further comprising:
providing at the user interface a second possible resolution action for resolving the error type, the second resolution action including at least a part of the description metadata for the error type such that a user may implement the second resolution action.

12. The method in accordance with claim 9, wherein the error is one of a database error, a validation error, a commit error, or an operating system error.

13. The method in accordance with claim 9, wherein each error handlers includes metadata specifying the name of the error handler, a description of the error handler, error resolution instructions, and context-specific parameters.

14. The method in accordance with claim 9, wherein each error resolution template further includes description metadata having a unique identifier for the error resolution template.

15. In a computer system including one or more processors and system memory, a computer program product comprised of physical storage media containing computer-executable instructions for implementing at the computer system a method of providing unified and configurable error resolution for one or more components executing at the computer system, the method comprising:
storing a global list of errors of various types that may occur while any of the one or more components are executing;
storing a plurality of error handlers at an error handler module, each of which define operations configured to resolve error types stored in said global list;
storing a plurality of policies at a life time module, each policy specifying actions for error removal;
each of the one or more components performing the following:
defining its own error types and adding the defined error types to said global list,
defining its own error handlers and adding the defined error handlers to said error handler module;
defining one or more polices for its own defined error types and adding the defined policies to said life time module;
generating at a template generator a plurality of error resolution templates by performing the following:
accessing error types stored at said global list,
accessing error handlers from said error handler module,
accessing polices from said life time module;
associating at least one accessed policy and at least one error handler with each accessed error type, and then storing each accessed error type with the associated error handler and policy in a separate error resolution template;

during execution of the one or more components, identifying first and second error types;

identifying from the plurality of error resolution templates at the template generator a first error resolution template configured to resolve the first error type and associating the first error type with the first error resolution template;

in the event an error resolution template cannot be identified for the second error type, submitting a new error resolution template which includes at least one error handler configured to resolve the second error type to the template generator and adding it to the plurality of error resolution templates to thereby extend the error resolution capabilities of the template generator; and thereafter associating the second error type with the new error resolution template, to resolve the second error type.

\* \* \* \* \*

UNITED STATES PATENT AND TRADEMARK OFFICE
CERTIFICATE OF CORRECTION

PATENT NO.         : 8,078,914 B2
APPLICATION NO.    : 12/477504
DATED              : December 13, 2011
INVENTOR(S)        : Gunter Leeb et al.

Page 1 of 1

It is certified that error appears in the above-identified patent and that said Letters Patent is hereby corrected as shown below:

In column 13, line 13, in Claim 6, after "with the" insert -- new --.

In column 13, line 16, in Claim 7, delete "handlers" and insert -- handler --, therefor.

In column 14, line 9, in Claim 9, delete "handlers" and insert -- handler --, therefor.

In column 14, line 12, in Claim 10, delete "handlers" and insert -- handler --, therefor.

In column 14, line 26, in Claim 13, delete "handlers" and insert -- handler --, therefor.

In column 14, line 59, in Claim 15, delete "list," and insert -- list; --, therefor.

Signed and Sealed this
Thirty-first Day of January, 2012

David J. Kappos
*Director of the United States Patent and Trademark Office*